Figure 1:
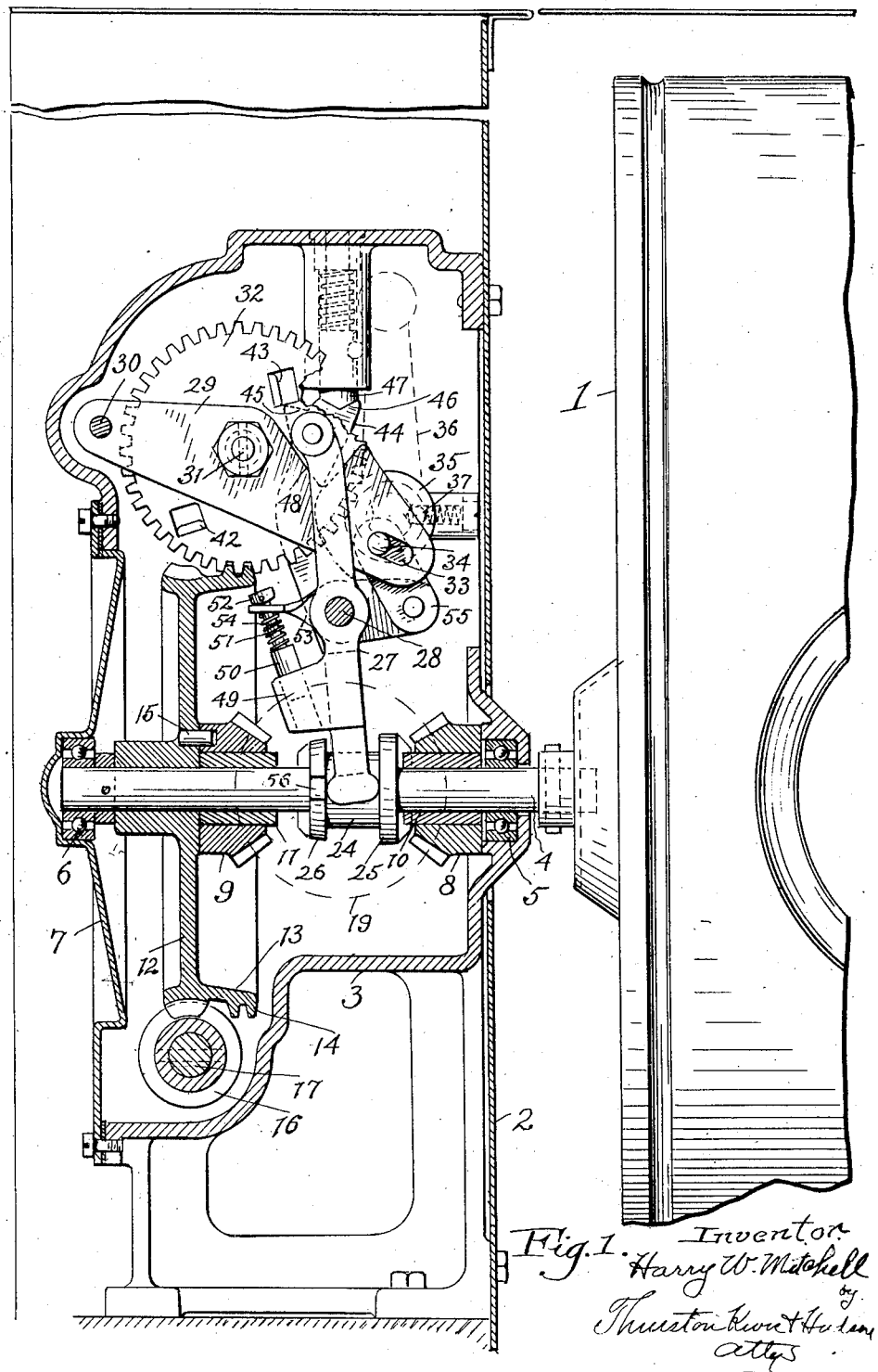

June 14, 1927. 1,632,091

H. W. MITCHELL

WASHER DRIVE MECHANISM

Filed April 2, 1923 3 Sheets-Sheet 1

Inventor
Harry W. Mitchell
by
Thurston Kwit & Hodson
Attys

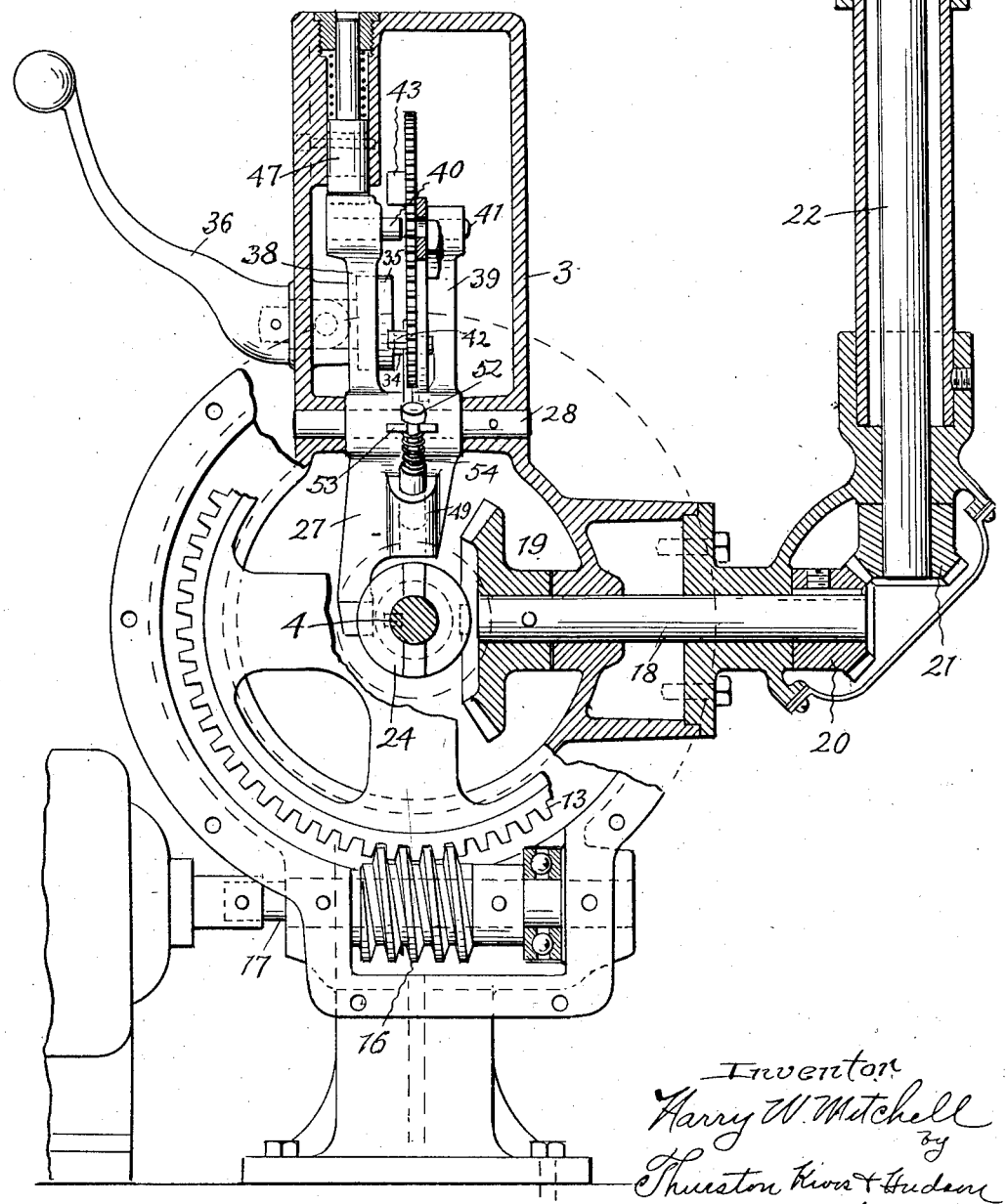

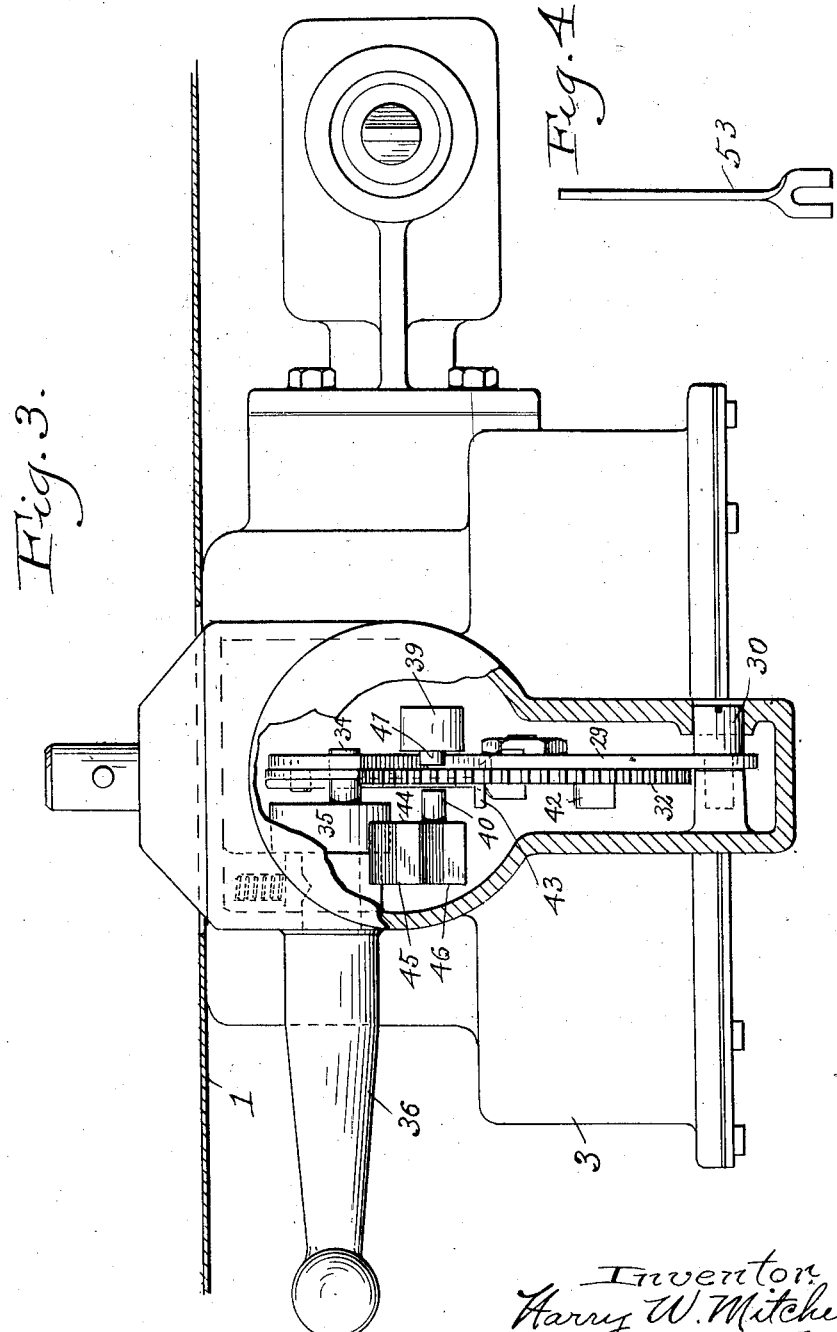

Patented June 14, 1927.

1,632,091

UNITED STATES PATENT OFFICE.

HARRY W. MITCHELL, OF CLEVELAND, OHIO, ASSIGNOR TO G. F. MITCHELL & SON, A PARTNERSHIP OF GEORGE F. MITCHELL, GEORGE R. MITCHELL, AND HARRY W. MITCHELL, OF CLEVELAND, OHIO.

WASHER DRIVE MECHANISM.

Application filed April 2, 1923. Serial No. 629,278.

This invention relates to driving mechanism for washing machines of the rotary cylinder type, and more particularly to an automatic reversing drive mechanism through which the cylinder is driven a predetermined number of turns.

It is an object of the present invention to provide an automatic reversing drive mechanism which has a minimum number of parts and which occupies a minimum amount of space.

A further object is to provide a washer drive mechanism of the automatic reversing type in which the washer cylinder can be stopped at any time independently of the drive shaft.

A further object is to provide a washer drive in which the cylinder can be disconnected from the drive shaft and brought to a stop always in the same position.

A further object is to provide a washer drive of the automatic reversing type in which the wringer drive shaft is so connected to the reversing gear that it will be continuously driven in one direction regardless of whether the cylinder is rotating or stopped and regardless of the direction of rotation of the cylinder.

A further object is to provide a manual control for the automatic reversing mechanism by means of which the automatic clutch shifting mechanism is rendered inoperative and the reversing clutch is simultaneously shifted to neutral position.

A further object is to provide in connection with an automatic clutch shifter a continuously rotating part adapted to impart initial movement in both directions to the clutch and in connection therewith a spring actuated device for completing the movements of the clutch.

Other objects will be apparent from the following description and accompanying drawings.

The following description and accompanying drawings set forth in detail certain means embodying the invention, the disclosed means, however, constituting but one of the various mechanical forms in which the principle of the invention may be employed.

Reference should be had to the accompanying drawings forming a part of this specification in which Fig. 1 is a vertical section through the reversing gear substantially in the plane of the axis of the cylinder; Fig. 2 is a vertical section in a plane at right angles to the section shown in Fig. 1 and substantially in the plane of the wringer drive shaft; Fig. 3 is a top plan view with a portion of the gear housing broken away to show the reversing mechanism; Fig. 4 is a detail plan view of the locking pin actuating lever.

Referring to the accompanying drawing, the cylinder 1, a fragmentary portion of which is shown in Fig. 1, is rotatably mounted in a suitable supporting frame 2 and is driven from suitable gearing contained within a gear housing 3 suitably supported at one end of the supporting frame 2. Attached to the central portion of the head of the cylinder 1 adjacent the gear housing 3 is a shaft 4 which is journaled adjacent the cylinder head in a bearing 5 carried by the inner wall of the housing 3 and has its outer end journaled in a bearing 6 carried by the detachable outer plate 7 of the gear housing. Bevel gears 8 and 9 which are fixed to sleeves 10 and 11, loose on the shaft 4 are arranged within the gear housing with their beveled sides facing each other. Outside the outer bevel gear 9 is a worm gear 12 which is loose upon the shaft 4 and has an inwardly projecting peripheral flange 13 which has a worm 14 formed upon its outer face. The worm gear 12 is connected to the bevel gear 9 by means of a pin 15 so that the bevel gear 9 rotates in unison with the gear 12. The gear 12 is driven by means of a worm 16 fixed to a drive shaft 17 which extends transversely with respect to the shaft 4 and is journaled in the lower portion of the gear housing 3.

A wringer operating shaft 18 shown in Fig. 2 is journaled in the housing 3 and is disposed radially with respect to the shaft 4 and at right angles thereto. A bevel gear 19 is fixed to the inner end of the shaft 18 and meshes with the bevel gears 8 and 9 so that the bevel gear 8 is continuously driven from the gear 9 in a direction opposite to the direction of movement of the gear 9. The shaft 18 has a bevel gear 20 at its outer end which meshes with the bevel gear 21 at the lower end of an upright shaft 22, the upper end of which projects into the socket which receives the wringer supporting standard 23.

A clutch member 24 is splined to the shaft 4 between the two bevel gears 8 and 9 and has teeth at its opposite ends engageable with clutch teeth formed upon the sleeves 10 and 11 which carry the gears 8 and 9. The clutch member 24 has peripheral flanges 25 and 26 at the inner and outer ends thereof which form between them a peripheral groove adapted to receive the end of a suitable clutch shifting lever. The clutch shifting lever 27 is pivoted upon a pin 28 which extends across the housing 3 above the shaft 4 and at right angles to the shaft 4. By shifting the lever 27 about its pivot 28 the clutch member 24 can be shifted from engagement with one of the bevel gears through a neutral position into engagement with the other bevel gear causing the direction of rotation of the driven shaft 4 to be reversed.

In order to cause the washer cylinder to alternately rotate a given number of turns in opposite directions, automatically operating means, which will now be described, are provided for periodically actuating the lever 27 in opposite directions to shift the clutch member 24 from one of its engaging positions to the other. An arm in the form of a flat plate 29 is pivoted on a pin 30 adjacent the top of the housing 3 toward the outer side thereof. The pivot pin 30 extends at right angles to the shaft 4 and the pivoted arm 29 lies directly over the shaft 4. Substantially midway between the ends thereof, the arm 29 carries a transversely extending stub shaft 31 carrying a gear 32 adapted to mesh with the worm 14 carried by the gear 12. Suitable means are provided for swinging the arm 29 about its pivot 30 to engage the gear 32 with the worm 14 or to disengage the gear 32 from the worm. For swinging the arm 29 about its pivot, the arm 29 is provided adjacent its inner free end with a longitudinally extending slot 33 which is engaged by a pin 34 which is eccentrically mounted on the end face of a rotary member 35 which is journaled in the wall of the gear housing 3 and has a handle 36 attached to its outer end outside the gear housing by means of which the rotary member 35 may be turned to swing the arm 29 about its pivot. In order to releasably hold the rotary member 35 in either of two adjusted positions, in one of which the gear 32 is held in engagement with the worm 14 and in the other of which the gear 32 is held clear of the worm 14, a spring detent 37 is mounted on the wall of the housing and engages with either of two shallow tapered recesses on diametrically opposite portions of the periphery of the rotary member 35.

Interengaging parts are provided on the gear 32 and the lever 27 for alternately shifting the lever in opposite directions. The lever 27 is forked above the pivot 28 thereof and has forked arms 38 and 39 which lie upon opposite sides of the gear 32 and its supporting arm 29, the arms 38 and 39 being provided with pins 40 and 41 which project from the inner faces thereof toward the gear 32. The gear 32 is provided with two cam lugs 42 and 43 which are preferably in the form of integral tongues struck up from the body of the gear 32 and which are preferably spaced substantially 180° apart, are positioned at different distances from the center of the gear and have oppositely inclined pin engaging faces. The cam lugs 42 and 43 are so arranged and proportioned that they will engage the pin 40 when the lever 27 is in its extreme positions and shift the lever toward its opposite extreme positions. The cam lugs 42 and 43, however, preferably do not shift the lever 27 far enough to cause the clutch teeth of the clutch member 24 to engage with the opposite bevel gear, since the teeth of the clutch member and gear might not be in proper alignment at the instant of engagement and the shifting mechanism would be subjected to severe strains and shocks. It is therefore desirable that the clutch member be yieldingly pressed into engagement with the gears. The cam lugs 42 and 43 are therefore utilized to impart only partial movements to the lever 27, the final movements thereof forcing the clutch member into engagement with the gears being effected by a spring actuated device which will now be described.

The arm 38 has an enlarged end 44 at its upper end in which V-notches 45 and 46 are formed. A spring pressed pin 47 which is arranged to slide vertically and is disposed radially with respect to the pivotal axis of the lever 27 has a lower end formed to fit in the notches 45 and 46. The movement imparted to the lever 27 by one of the cam lugs on the gear 32 shifts the lever 27 just far enough to cause the pin 47 to be moved out of engagement with one of the notches 45 or 46 into partial engagement with the other notch, whereupon the inclined end face of the pin 47 bearing with spring pressure against the inclined side of the V-notch will shift the lever 27 an additional distance sufficient to bring the pin 47 into full engagement with the notch. The V-notches 45 and 46 are so positioned that when the pin 47 is in full engagement with these notches the clutch member 24 is yieldingly locked in one or the other of its extreme positions in which one or the other of the gears 8 and 9 is clutched to the shaft 4. If in the movement of the clutch member 24 into engagement with either gear the clutch teeth are not in proper alignment at the instant of engagement, a yielding pressure will be exerted upon the clutch member by the spring pressed pin 47 until the gear has rotated sufficiently to permit the clutch member 24 to snap into engagement therewith.

When the handle 36 is operated to shift the gear 32 out of engagement with the worm 14, the pin 41 carried by the arm 39 will be engaged by the side of a V-notch 48 on the upper side of the arm 29 which acts to shift the lever 27 to neutral position so that as the automatic lever shifting mechanism is rendered inoperative the shaft 4 is simultaneously disconnected from both of the bevel gears.

It is desirable to provide means which will automatically bring the washer cylinder to a stop when the clutch member is shifted to neutral position by the manually operated handle 36. To accomplish this the lever 27 immediately above the clutch member 24 has a lateral projection 49 in which is slidably mounted a locking pin 50 which has a reduced stem 51 and a head 52 secured to the upper end of the stem. An actuating lever 53 for the locking pin is pivoted intermediate its ends on the pivot pin 28 and has a forked end which slidably engages the stem 51 of the locking pin. A coil spring 54 is mounted on the reduced stem 51 between the enlarged lower end portion thereof and the lever 53 so that as the lever 53 is actuated to move the locking pin downwardly, the locking pin is yieldingly pressed against the periphery of the end flange 26 of the clutch member 24.

In order to automatically move the locking pin into engagement with the clutch member upon operation of the handle 36, the inner end of the lever 53 is connected to the eccentric pin 34 by means of a link 55. When the eccentric pin 34 is in its lowermost position in which it holds the gear 32 in mesh with the worm 14, the lever 53 engages the head 52 at the upper end of the locking pin and holds the locking pin out of engagement with the clutch member. When the handle 36 is turned substantially a half revolution to disengage the gear 32 and shift the clutch member to neutral position, the end of the lever 53 engaging the locking pin is swung downwardly a sufficient distance to move the locking pin 50 into engagement with the flange 26 of the clutch member and to compress the coil spring 54. The flange 26 is provided with a notch 56 with which the locking pin 50 engages to stop the rotation of the shaft 4 and of the cylinder to which it is attached. The notch 56 is preferably so positioned that the cylinder 1 will be brought to a stop with the opening 27 thereof at the top of the cylinder. Whenever the manual controlling means is operated to disconnect the automatic gear shifter and to move the clutch to neutral position, the locking pin will be brought into yielding engagement with the flange 26 of the clutch member 24, permitting the continued rotation of the cylinder due to its momentum until the notch 56 comes into alignment with the locking pin 50 at which time the locking pin 50 will snap into the notch 56 and stop the rotation of the cylinder.

In the operation of the washing machine it is desirable that the operation of the wringer mechanism be entirely independent of the operation of the washer cylinder. In accordance with the present invention as long as the drive shaft 17 is rotated, the bevel gears 8 and 9 on the shaft 4 will be continuously rotated in opposite directions and the wringer shaft 18 will be continuously driven in one direction. During the operation of the washer the cylinder is periodically and automatically reversed by means of the cam lugs on the gear 32 and the spring pressed plunger 47 which imparts the final movement to the reversing clutch and yieldingly presses the clutch into engagement with the opposed gears 8 and 9. When it is desired at any time to stop the rotation of the washer cylinder, the handle 36 will be turned through 180° rendering the automatically operating clutch shifting mechanism inoperative, moving the clutch member to neutral position and locking the cylinder against rotation with its opening at the top of the cylinder. This manual control of the washer cylinder does not affect the operation of the wringer driving shaft, since the gear 19 will continue to be driven by the bevel gear 9.

Having described my invention, I claim—

1. A washer drive mechanism comprising a drive shaft, a driven shaft, a pair of rotatable members loose upon the driven shaft, means for continuously driving said members in opposite directions from the drive shaft, a shiftable clutch element adapted to be shifted to alternately clutch said members to the driven shaft, clutch shifting mechanism operated by the drive shaft for alternately shifting the clutch element in opposite directions, and means for simultaneously disconnecting said clutch shifting mechanism from the drive shaft and moving said clutch element to neutral position out of engagement with both the rotatable members on the driven shaft.

2. A washer drive mechanism comprising a driven shaft, a pair of rotatable members loose on the driven shaft, means for continuously rotating said members in opposite directions, a clutch element shiftable in opposite directions through a neutral position to alternately clutch said rotatable members to the shaft, means operable to shift said clutch element from one extreme position to the other to reverse the rotation of the driven shaft, and auxiliary means for shifting said clutch element to neutral position and locking said driven shaft against rotation.

3. A washer drive mechanism comprising a driven shaft, a pair of spaced rotatable members loose on said shaft, means for continuously driving said members in opposite directions, a clutch element splined to the shaft between said rotatable members, a shifting lever engaging said clutch element and movable to shift said clutch element from engagement with one rotatable member to the other to reverse the rotation of the driven shaft, means for automatically and periodically shifting said lever to operate the driven shaft in opposite directions, a locking member carried by the lever and engageable with a part of said clutch element to lock the driven shaft against rotation, and manually operable means for shifting said lever to neutral position and moving said locking member into engagement with said clutch member.

4. A washer drive mechanism comprising a driven shaft, a rotatable driving member loose on said shaft, means for rotating said member, a collar splined to the shaft and shiftable into and out of engagement with said driving member, said collar having a notch in the periphery thereof, said driving member and collar having coacting clutch elements thereon, means for shifting said collar, and a yieldably mounted locking member engageable with the periphery of said collar when the same is disengaged from the driving member and adapted to enter said notch to lock the shaft against rotation and in a predetermined position.

5. A washer drive mechanism comprising a driven shaft, a gear loose on said shaft, means for continuously driving said gear in one direction, a second gear loose on the shaft, means for continuously driving said gear from the first gear and in an opposite direction, a shiftable clutch element operable to alternately clutch said gears to the shaft, a lever for shifting said clutch element, a rotatable member driven from said first gear, cam lugs on said rotatable member adapted to successively engage the lever to shift the same in opposite directions.

6. A washer drive mechanism comprising a drive shaft having a worm thereon, a driven shaft, a gear loose on said driven shaft and meshing with the worm on the drive shaft, a second gear loose on the driven shaft, means for driving said second gear, a clutch element shiftable to alternately lock said gears to the driven shaft, a lever for shifting said clutch element, a worm formed integrally with said first mentioned gear and a gear meshing with said worm, said gear having spaced cam lugs successively engageable with said lever to shift the same alternately in opposite directions.

7. A washer drive mechanism comprising a driven shaft, a pair of rotatable members loose on said shaft, means for continuously driving said members in opposite directions, a clutch element splined to the shaft and shiftable to alternately connect said members to the shaft, a pivoted lever connected to said clutch element to shift the same, a locking pin slidably mounted on said lever for movement toward and from the clutch element, said clutch element having a peripheral socket adapted to receive said pin, and manually operable means for shifting said locking pin into engagement with the clutch element to lock the driven shaft against rotation.

8. A washer drive mechanism comprising a driven shaft, a pair of rotatable members loose on the driven shaft, means for continuously rotating said members in opposite directions, a clutch element shiftable in opposite directions through a neutral or disengaged position to alternately clutch said rotatable members to the shaft, means operable to shift said clutch element from one extreme position to the other to reverse the rotation of the driven shaft, and auxiliary means for shifting said clutch element to neutral position and for stopping the driven shaft in a given position.

9. A washer drive mechanism comprising a driven shaft, a pair of rotatable members loose upon said shaft, means for continuously driving said members in opposite directions, a clutch element shiftable in opposite directions through a neutral or disengaged position to alternately clutch said rotatable members to the shaft, means operated by the driving means for automatically and periodically shifting said clutch member to rotate said driven shaft first in one direction and then in the other, and manually operable means for disconnecting said clutch operating means from the driving means, shifting said clutch element to neutral position and stopping the driven shaft in a given position.

10. A washer drive mechanism, a drive shaft, a driven shaft, a gear member wheel on the driven shaft and driven from the drive shaft, said gear member having a laterally extending flange adjacent its periphery with a worm formed thereon, a gear meshing with the worm, a bevel gear loose on the driven shaft and attached to said gear wheel, a second bevel gear loose on the driven shaft, a clutch member splined to said driven shaft and engageable with either bevel gear, a third bevel gear carried by a shaft at right angles to the driven shaft and meshing with the two bevel gears on the driven shaft, a lever pivoted on an axis transverse with respect to the driven shaft and engaging the clutch member to shift the same, a pair of cam lugs on the gear which meshes with the worm, said lugs being successively engageable with the lever to impart an initial movement thereto in opposite directions, said lever having an outer end portion formed with V-notches, and a spring pressed plunger mounted on a fixed support and having a tapered end portion adapted to engage alternately with said V-notches to impart the final movement to the clutch lever in both directions.

11. A washer drive mechanism comprising a gear housing, a drive shaft extending into said housing, a driven shaft journaled in said housing at right angles to the drive shaft, a worm on the drive shaft, a worm gear loose on the driven shaft and meshing with the worm on the drive shaft, a worm integral with said worm gear, a bevel gear loose on the driven shaft and attached to said worm gear, a second bevel gear loose on the driven shaft, a bevel gear meshing with both bevel gears on the driven shaft to drive the second bevel gear from the first, a clutch member splined to the driven shaft and shiftable into engagement with either bevel gear thereon, a lever engaging the clutch member to shift the same, an arm pivoted to the housing on an axis transverse to the driven shaft, a gear carried by the arm and meshing with the worm on the worm gear, manually operable means engaging the free end of the pivoted arm and adapted to normally hold the same in a position in which the gear carried thereby meshes with the worm on the worm gear, said manually operable means being shiftable to swing the arm on its pivot to disengage the gear carried thereby, cam lugs on the last mentioned gear engageable with the clutch lever to shift the same in opposite directions, and means on the arm engageable with the clutch lever to shift the same to neutral position upon operation of the arm in a direction to disengage the lever operating gear.

In testimony whereof, I hereunto affix my signature.

HARRY W. MITCHELL.